United States Patent [19]
Rotondo

[11] Patent Number: 5,950,363
[45] Date of Patent: Sep. 14, 1999

[54] POTTED PLANT PROTECTOR

[76] Inventor: Bruno Rotondo, 126 Knickerbocker Rd., Plainview, N.Y. 11803

[21] Appl. No.: 09/197,058

[22] Filed: Nov. 20, 1998

[51] Int. Cl.⁶ .................................................. A01G 9/02
[52] U.S. Cl. .................................................. 47/84
[58] Field of Search .................. 47/75, 69, 60, 47/61, 84

[56] References Cited

U.S. PATENT DOCUMENTS

| | | | |
|---|---|---|---|
| 3,704,545 | 12/1972 | Van Reisen | 47/34.11 |
| 3,869,828 | 3/1975 | Matsumoto | 47/34.11 |
| 4,142,324 | 3/1979 | Magyar, Jr. | 47/75 |
| 4,143,191 | 3/1979 | Chavis | 47/48.5 |
| 4,979,332 | 12/1990 | Nagaya et al. | 47/69 |

OTHER PUBLICATIONS

Random House Webster's College Dictionary, at p. 287, definition of Conic Section.

*Primary Examiner*—Thomas Price
*Attorney, Agent, or Firm*—Myron Amer P.C.

[57] ABSTRACT

For a plant potted in a conical pot, an oversized conical sleeve disposed in encircling relation about the conical pot and, in advance of a storm or similar plant-destroying weather condition, the sleeve is raised into an in-use position protecting the plant. The in-use raised position is maintained by a friction fit established between the difference sizes of conical pot and sleeve. During non-use of the sleeve, it is held in its encircling position by the weight of the conical pot and growing earth of the plant.

1 Claim, 1 Drawing Sheet

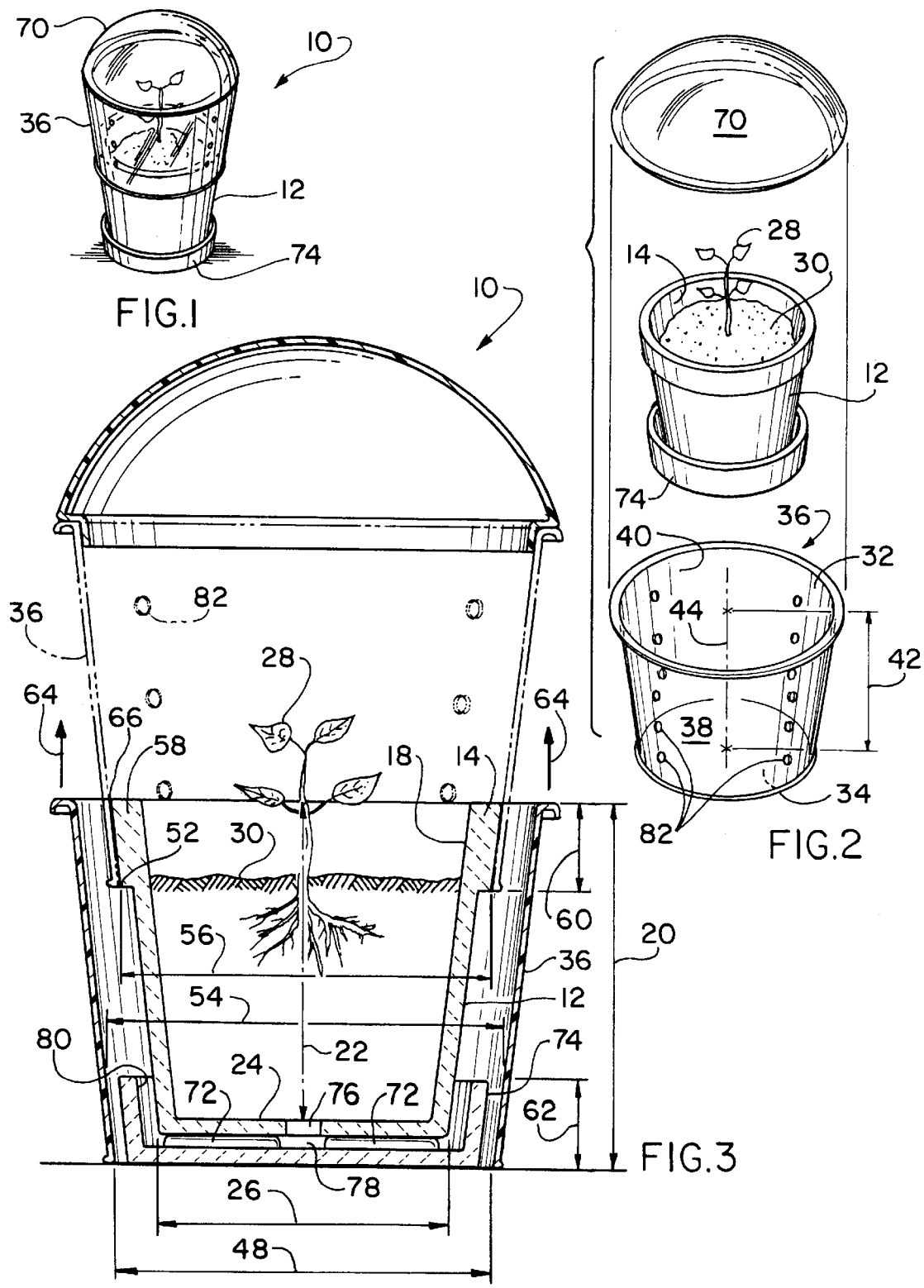

POTTED PLANT PROTECTOR

The present invention relates generally to improvements in preventing weather-caused damage to plants and, more particularly, to improvements that result by using to advantage the growing environment of the plant.

EXAMPLE OF THE PRIOR ART

To prevent weather-caused damage, it is already known to provide an enclosure about a plant to serve as a weather barrier, as documented in prior patents, one exemplary prior patent being U.S. Pat. No. 4,829,707 issued to Koffle et al. for "Plant Protector" on May 16, 1989. It is known however, by common experience, that little use is made of plant protectors of the nature of the '707 Patent, and it is believed that this is due to the seeking of end use objectives that are unattainable, such as maintaining the protector itself stable during a windstorm or the like, or in a storage position preparatory to use in the event of a storm.

In contrast, the within inventive plant protector focuses on providing weather barrier service to potted plants, herein recognized as being a significant category of plants to warrant such service, and wherein the growing environment of the plant, namely, the pot, has structural features that can be and are herein used to advantage to obviate weather-caused damage. To a similar end of contributing to utility, the potted plant is also used to maintain the plant-protecting component in a non-use position preparatory to an in-use position thereof, all as will be better understood as the description proceeds.

Broadly, it is an object of the present invention to provide a plant protector that as a practical matter can be implemented, and accordingly overcomes the foregoing and other shortcomings of the prior art.

More particularly, it is an object to use a conical plant-protecting member of a plant potted in a conical pot which, in practice, is readily raised into encircling relation about the plant and held in place by a friction fit at an interface of the conical surfaces, to the end of making practical widespread use and thus contributing to a correspondingly widespread practice of obviating weather-caused damage to potted plants.

The description of the invention which follows, together with the accompanying drawings should not be construed as limiting the invention to the example shown and described, because those skilled in the art to which this invention appertains will be able to devise other forms thereof within the ambit of the appended claims.

FIG. 1 is an assembled potted plant protector according to the present invention;

FIG. 2 is an exploded disassembled perspective view of the components of FIG. 1; and FIG. 3 is a cross sectional view of the assembled potted plant protector of FIG. 1 as taken along line 3—3 of FIG. 2, in an enlarged scale, and in which a plant-protecting member thereof is shown in full line perspective in its non-use position and in phantom perspective in its in-use position.

It is well known by common experience that young bushes, shrubs, vegetable plants or flowers can sustain significant damage from wind, rain, snow, frost, hail and sudden temperature changes, and thus in prior patents, as exemplified by U.S. Pat. No. 4,829,707 for "Plant Protector" issued to Koffler et al. on May 16, 1989, provision is made for an encircling tubular construction to serve as a weather barrier. The focus of the within invention is a potted plant, generally designated 10, in connection with which the pot, generally designated 12, is used to advantage to contribute to protecting the potted plant, all as will be better understood as the description proceeds.

The plant pot typically made of clay construction material, is also typically provided with a top 14 open-ended conical wall 16 bounding a cone-shaped compartment 18 of a selected height 20 as measured by an axis 22 of the compartment 18, and also has a bottom 24 of a selected dimension 26, serving as a closure for the compartment, as measured by a diameter of a circle or said bottom 24 extending perpendicularly of the axis 22, the plant 28 and growing earth 30 being positioned in the compartment 18.

Cooperating with the pot 12 is a top 32 and bottom 34 open-ended plastic plant-protecting member, generally designated 36, having a conical wall 38 similarly bounding a cone-shaped compartment 40 of a selected height 42 as measured by an axis 44 of the compartment 40, and also having said bottom opening 34 of a selected diameter 48 extending perpendicularly of the compartment axis.

It will be understood that the heights 20 and 42 are approximately the same, and that dimension 48 is greater than dimension 26 adjacent the bottom of the pot 12, but this size difference exists only up to the location 52 adjacent the top 14 of the pot 12, at which location 52 the diameter 48 of the plant-protecting member 36 is the same as the diameter 56 of a ring 58 molded integral on the pot 12 to minimize chipping in the pot opening 14. As measured from the pot top opening 14 the ring 58 extends downwardly a distance 60 and, as measured from the bottom 24, the aptly denominated interference diameter 54 is approximately the same distance 62 above the bottom 24.

In use, the plant-protecting member 36 is placed in encircling relation about the pot 12, such that the weight of the growing earth 30 and, to some extent, the weight of the plant 28, prevent movement of the plant-protecting member 36 from its encircling position preparatory to it being moved from this non-use position into a position of use. More particularly, because of the size differences of the dimensions 26 and 48, the plant-protecting member 36 has an ascending degree of movement 64 until diameter 48 contacts ring 58, as at 66. This contact results in the establishment of a friction fit at location 66, which in practice has been found to hold the plant-protecting member in its raised position, as designated in phantom perspective in FIG. 3, to contribute to enabling the plant-protecting member 36 to serve as an effective weather barrier. The friction fit at 66 is released by manually urging the plant-protecting member 36 in descending movement.

For completeness sake it is noted that the top opening 32 of the plant protecting member 36 is preferably closed by an appropriately sized and shaped cover 70, and that the bottom 24 of the pot 12 is preferable seated on spacers 72 in an interposed position between the bottom 24 and a saucer 74 to allow water drainage through an aligned opening 76 and a clearance 78 in communication with a compartment 80 of the saucer 74. Lastly, vent holes 82 as required are provided in the wall 38 of the plant-protecting member 36, as best shown in FIG. 2.

While the apparatus herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A potted plant protector comprising a top open-ended pot having a conical wall bounding a first cone-shaped compartment of a selected first height as measured by an axis of said first cone-shaped compartment and having a bottom of a first selected dimension in a closure for said pot as measured by a diameter of a circle extending perpendicularly at the axis of said first cone-shaped compartment, a top and bottom open-ended plant-protecting member having a conical wall bounding a second cone-shaped compartment of a selected second height as measured by an axis of said second cone-shaped compartment and having a bottom second selected dimension in a bottom opening as measured by a diameter of a circle extending perpendicularly of the axis of said second cone-shaped compartment, said selected second height being of the same extent as said first height of said respective second and first cone-shaped compartments and said second dimension being greater only up to a selected location adjacent the top of said pot and then smaller than the first dimension of said respective second and first cone shaped compartments, and an operative position of said plant-protecting member in encircling relation about said pot, said plant-protecting member being movable in an ascending direction relative to said pot up to said selected location adjacent the top of said pot as allowed by the size differences in the first and second cone-shaped compartments, whereby there is frictional engagement at said location adjacent the top of said pot by a raised plant-protecting member to contribute to holding said member in a position protecting any growing plant in the pot.

* * * * *